United States Patent Office 3,037,055
Patented May 29, 1962

3,037,055
PREPARATION OF OXAMIDE
William L. Fierce, Crystal Lake, Walter J. Sandner, Carpentersville, and Roger L. Weichman, Grayslake, Ill., assignors to The Pure Oil Company, Chicago, Ill., a corporation of Ohio
No Drawing. Filed Apr. 28, 1960, Ser. No. 25,240
6 Claims. (Cl. 260—561)

This invention relates to new and useful improvements in processes for the preparation of oxamide, and more particularly to a process in which cyanogen is hydrolyzed to oxamide in a ternary mixture of water, concentrated hydrohalic acid, and acetic acid or acetic anhydride.

Oxamide is a well-known organic chemical which is useful as an intermediate in the preparation of other organic compounds and which has potential use as a fertilizer. Oxamide has a high nitrogen content and a low water solubility which provide a source of nitrogen for the soil which is utilizable slowly over an extended period of time. Oxamide, however, has not been used commercially as a fertilizer due to its relatively high cost. While previous proposals have been made for the manufacture of oxamide from cyanogen, they have not been carried out commercially due to the initial expense of the cyanogen and the inefficiency of the process of hydrolysis of cyanogen to oxamide.

The hydrolysis of cyanogen to oxamide has been previously reported in the literature. In 1860, von Liebig reported (Ann., 113, 246) that cyanogen could be treated with an aldehyde to produce oxamide. In 1867, Schmitt and Glutz (Ber., 1, p. 66), reported that when cyanogen is contacted with aqueous concentrated hydrochloric acid, oxamide forms as crystals which separate from the cyanogen-saturated acid. They also reported the formation of small quantities of ammonium oxalate. In 1916, Bucher, in U.S. Patent 1,194,354, disclosed an improved process for hydrolysis of cyanogen to oxamide using concentrated hydrochloric acid. Bucher reported that it is necessary to keep the hydrolysis reaction relatively cool, since higher temperatures favor the formation of oxalic acid, and that carrying out the hydrolysis of cyanogen under higher pressure increased the formation of oxamide considerably, probably due to the increased solubility of cyanogen at higher pressures. Bucher also reported that it was necessary to use hydrochloric acid of very high concentration, that diluting the acid reduced considerably the formation of oxamide, and that sulfuric acid and nitric acid are ineffective for hydrolyzing cyanogen.

One object of this invention is to provide a new and improved process for the preparation of oxamide.

Another object of this invention is to provide an improved process for the preparation of oxamide by the hydrolysis of cyanogen.

A feature of this invention is the provision of an improved process for the hydrolysis of cyanogen to oxamide in a mixture of hydrohalic acid, glacial acetic acid (or acetic anhydride), and water.

A further feature of this invention is the provision of an improved process for the hydrolysis of cyanogen to oxamide using a ternary mixture of concentrated hydrohalic acid, glacial acetic acid (or acetic anhydride), and water, in which the hydrohalic acid is present in a molar excess over the cyanogen, and water constitutes less than 50% by volume of the mixture.

Other objects and features of this invention will become apparent from time to time throughout the specification and claims as hereinafter related.

This invention is based upon our discovery that cyanogen can be hydrolyzed to oxamide in concentrated hydrochloric acid mixed with water and glacial acetic acid or acetic anhydride. In this mixture, the glacial acetic acid or acetic anhydride constitutes from 10 to 90% by volume, while the concentrated hydrohalic acid (preferably hydrochloric acid) constitutes from 10 to 90% by volume. Water is present in a concentration of 5 to 50% by volume. The hydrolysis of cyanogen in this mixture is carried out at a temperature in the range from 0–75° C., which is high enough to increase the rate of reaction, but not sufficient to promote the formation of oxalic acid to a substantial degree.

In carrying out this invention, a mixture of water, concentrated hydrochloric acid, and glacial acetic acid, or acetic anhydride, are charged to a suitable gas-tight container. In a static system, the reactants and solvents may be sealed in a glass vial and agitated occasionally. In a continuous system, the cyanogen may be continuously bubbled through the mixture of water, hydrochloric acid, and acetic acid. The hydrochloric acid (or other hydrohalic acid, e.g., hydrobromic, or hydriodic acid) must be present in a molar excess over the cyanogen. The amount of water added to the mixture must constitute less than 50% by volume, i.e., the total volume of acetic acid (or acetic anhydride) and hydrochloric acid must exceed the volume of the water in the mixture. The reaction may be carried out at a temperature in the range from about 0° to 75° C. The reaction pressure may vary from low subatmospheric pressures to very high superatmospheric pressures, depending only on the type of reactor used. At higher pressures, the rate of conversion of cyanogen is higher due to the increased solubility of cyanogen in the hydrolysis medium. While the reaction proceeds satisfactorily at room temperature, the reaction rate may be increased several-fold by an increase of the reaction temperature to about 50°–75° C.

The following non-limiting examples are illustrative of the scope of this invention.

EXAMPLE I

In one experiment, 9.5 g. of cyanogen was contacted with a mixture of 30 ml. of concentrated sulfuric acid, 30 cc. of water, and 25 cc. of glacial acetic acid for six days at room temperature. The mixture was sealed in a glass vial and agitated occasionally. At the end of six days, there was no precipitate of oxamide formed. When cyanogen is contacted with glacial acetic acid, or with aqueous solutions of acetic acid for a like period, there is no formation of oxamide.

EXAMPLE II

In a series of experiments, cyanogen was hydrolyzed using various hydrolysis media. In one experiment, 9.7 g. of cyanogen was sealed in a 170-ml. vial with a mixture of 20 ml. of water and 80 ml. of concentrated hydrochloric acid. The vial was sealed and held at room temperature, with occasional inversion to mix the contents. After six days, the vial was opened and a precipitate was recovered which consisted of an impure oxamide (85% purity) representing a yield of 82%, based on the cyanogen charged. In another experiment, 9.0 g. of cyanogen was contacted for six days with a mixture consisting of 40 ml. of water and 60 ml. of concentrated hydrochloric acid. Oxamide of 93% purity was obtained in 90% yield. In a third experiment, 9.6 g. of cyanogen was contacted with a mixture consisting of 60 ml. of water and 40 ml. of concentrated hydrochloric acid for a period of six days. Oxamide of 94% purity was obtained in a yield of only 17%. In still another experiment, 9.6 g. of cyanogen was contacted with a mixture of 80 ml. of water and 20 ml. of hydrochloric acid. At the end of six days, no oxamide had formed.

EXAMPLE III

In another series of experiments, cyanogen was hydrolyzed using a mixture of concentrated hydrochloric acid, glacial acetic acid, and water. In the first experiment, 8.7 g. of cyanogen was sealed in a glass vial with a mixture consisting of 50 ml. of water, 10 ml. of glacial acetic acid, and 40 ml. of hydrochloric acid at room temperature for six days with occasional agitation. At the end of this time, oxamide (95% purity) was found to have formed in a yield of 61%, based on the cyanogen charged. From this experiment, it is seen that the substitution of 10 ml. of glacial acetic acid for a corresponding amount of water caused a very substantial increase in the yield of oxamide over the previous experiment utilizing hydrochloric acid of the same concentration. In a series of experiments, the relative amounts of concentrated hydrochloric acid, glacial acetic acid, and water were varied and the effect on the production of oxamide was determined. In these experiments, the reaction conditions were the same as in the previous examples, except for the variation in the relative amounts of acetic acid, water, and hydrochloric acid. The results of these experiments are set forth in Table I.

*Table I*

| Run No. | Water, ml. | Glacial Acetic Acid, ml. | Hydrochloric Acid (Conc.), ml. | Cyanogen, g. | Percent Yield Oxamide | Percent Purity of Product |
|---|---|---|---|---|---|---|
| 2 | 40 | 20 | 40 | 9.5 | 89 | 92 |
| 3 | 30 | 30 | 40 | 8.8 | 88 | 81 |
| 4 | 20 | 40 | 40 | 10.4 | 89 | 100 |
| 5 | 20 | 50 | 30 | 10.1 | 95 | 100 |
| 6 | 20 | 60 | 20 | 10.1 | 93 | 100 |
| 7 | 20 | 70 | 10 | 10.0 | 13 | 97 |
| 8 | 20 | 80 | ---- | 10.4 | 0.0 | ---- |

From the foregoing examples, it is seen that the substitution of glacial acetic acid for part of the mixture of water and concentrated hydrochloric acid results in a substantial improvement in the yield of oxamide from the hydrolysis of cyanogen. When acetic anhydride is substituted for acetic acid in the reaction mixture, the hydrolysis of cyanogen is accomplished in the same manner, since the acetic anhydride forms glacial acetic acid by reaction with the water in the system. When hydriodic acid or hydrobromic acid is substituted for concentrated hydrochloric acid in the hydrolysis system, the cyanogen is also hydrolyzed in good yields to produce oxamide of high purity. The concentration of hydrohalic acid may vary from 10 to 90% by volume, and the concentration of glacial acetic acid (or acetic anhydride) may also vary from 10 to about 90% by volume. The concentration of water in the mixture is preferably in the range of about 5–50% by volume. The relative proportions of hydrochloric acid and glacial acetic acid are not critical within the general ranges indicated. In fact, the principal requirement is that the hydrohalic acid must be present in a molar excess over the cyanogen, and that the volume of water in the mixture must constitute less than 50% of the mixture. While the examples given above were carried out at room temperature and atmospheric pressure, it should be noted that the reaction proceeds well at subatmospheric and superatmospheric pressures, and at temperatures in the range from about 0°–75° C. At higher pressures, e.g., up to 5000 p.s.i.g., or higher, the reaction rate is higher due to increased solubility of the cyanogen in the reaction mixture. At temperatures of 50°–75° C., the reaction rate is higher, although at the upper end of the temperature range there is an increased tendency toward formation of oxalic acid.

While we have described this invention fully and completely with special emphasis upon several preferred embodiments thereof, as required by the patent laws, we wish it understood that within the scope of the appended claims, the invention may be practiced otherwise than as specifically described herein.

The embodiments of the invention in which an exclusive property or privilege is claimed are defined as follows:

1. In a method for preparing oxamide by hydrolysis of cyanogen in an aqueous hydrohalic acid the improvement which comprises carrying out the hydrolysis in a ternary mixture comprising 5–50% vol. water, 10–90% vol. concentrated hydrohalic acid, and 10–90% vol. of a compound selected from the group consisting of glacial acetic acid and acetic anhydride, the hydrohalic acid being present in a molar excess over the cyanogen, at a temperature of 0°–75° C. for a time sufficient to effect a substantially complete hydrolysis of the cyanogen.

2. A method according to claim 1 in which the hydrohalic acid used is hydrochloric acid.

3. A method according to claim 1 in which the hydrohalic acid used is hydrobromic acid.

4. A method according to claim 1 in which the hydrohalic acid used is hydriodic acid.

5. A method according to claim 2 in which the compound is acetic acid.

6. A method according to claim 2 in which the compound is acetic anhydride.

References Cited in the file of this patent

UNITED STATES PATENTS

| 1,194,354 | Bucher | Aug. 15, 1916 |
| 2,573,673 | Ritter | Oct. 30, 1951 |
| 2,773,063 | Specht et al. | Dec. 4, 1956 |